(12) United States Patent
Wang

(10) Patent No.: US 9,884,538 B2
(45) Date of Patent: Feb. 6, 2018

(54) TURBO COMPOUND SYSTEM FOR VEHICLE

(71) Applicant: DOOSAN INFRACORE CO., LTD., Incheon (KR)

(72) Inventor: Tae Joong Wang, Gyeonggi-do (KR)

(73) Assignee: Doosan Infracore Co., Ltd., Incheon (KR)

( * ) Notice: Subject to any disclaimer, the term of this patent is extended or adjusted under 35 U.S.C. 154(b) by 437 days.

(21) Appl. No.: 14/374,791

(22) PCT Filed: Jan. 25, 2013

(86) PCT No.: PCT/KR2013/000587
§ 371 (c)(1),
(2) Date: Jul. 25, 2014

(87) PCT Pub. No.: WO2013/111980
PCT Pub. Date: Aug. 1, 2013

(65) Prior Publication Data
US 2015/0037178 A1 Feb. 5, 2015

(30) Foreign Application Priority Data

Jan. 26, 2012 (KR) .................. 10-2012-0007729
Jan. 26, 2012 (KR) .................. 10-2012-0007732
Mar. 20, 2012 (KR) .................. 10-2012-0028071

(51) Int. Cl.
*F02B 41/10* (2006.01)
*F02B 37/00* (2006.01)
(Continued)

(52) U.S. Cl.
CPC ............ *B60H 1/3222* (2013.01); *F01N 5/04* (2013.01); *F02B 37/00* (2013.01); *F02B 39/08* (2013.01);
(Continued)

(58) Field of Classification Search
CPC ...... F02B 41/10; F02B 37/004; F02B 37/005; Y02T 10/144; Y02T 10/163
(Continued)

(56) References Cited

U.S. PATENT DOCUMENTS 3,979,913 A * 9/1976 Yates ..................... F02G 5/00
60/618
5,329,770 A * 7/1994 Ward ..................... F01N 5/04
60/597

(Continued)

FOREIGN PATENT DOCUMENTS

| JP | 62-055420 | 3/1987 |
|---|---|---|
| JP | 07-102987 | 4/1995 |
| JP | 2006-299938 | 11/2006 |
| JP | 2007-303295 | 11/2007 |

OTHER PUBLICATIONS

Search Report dated May 13, 2013 and written in Korean with English translation for International Patent Application No. PCT/KR2013/000587 filed Jan. 25, 2012, 5 pages.

*Primary Examiner* — Peter J Bertheaud
(74) *Attorney, Agent, or Firm* — John D. Veldhuis-Kroeze; Westman, Champlin & Koehler, P.A.

(57) ABSTRACT

The present disclosure relates to a turbo compound system for a vehicle which recovers emission gas energy of an engine, and particularly, to a turbo compound system for a vehicle which may recover emission gas energy and provide the energy to various auxiliary devices for a vehicle in various forms. In addition, the present disclosure relates to a turbo compound system for a vehicle in which recovered emission gas energy is transferred directly to auxiliary devices for a vehicle without passing through a crank shaft for a vehicle, thereby preventing deterioration of fuel efficiency or output reduction, and simplifying facility and control.

6 Claims, 13 Drawing Sheets

(51) Int. Cl.
  *B60H 1/32*   (2006.01)
  *F02G 5/02*   (2006.01)
  *F01N 5/04*   (2006.01)
  *F02B 39/08*  (2006.01)
  *F02B 61/00*  (2006.01)
  *F04D 25/04*  (2006.01)

(52) U.S. Cl.
  CPC .............. *F02B 41/10* (2013.01); *F02B 61/00* (2013.01); *F02G 5/02* (2013.01); *F04D 25/04* (2013.01); *F02B 37/005* (2013.01); *Y02T 10/144* (2013.01); *Y02T 10/16* (2013.01); *Y02T 10/163* (2013.01); *Y02T 10/166* (2013.01)

(58) Field of Classification Search
  USPC ................................... 60/597–612, 614, 624
  See application file for complete search history.

(56) References Cited

U.S. PATENT DOCUMENTS

| | | | | |
|---|---|---|---|---|
| 6,470,680 B1* | 10/2002 | Janeke | .................... | F02B 63/04 60/597 |
| 7,047,743 B1* | 5/2006 | Stahlhut | .................. | F02B 37/18 123/562 |
| 7,434,389 B2* | 10/2008 | Robel | ................ | B60H 1/00435 60/274 |
| 8,261,550 B2* | 9/2012 | Sartre | .................... | B60K 6/365 60/607 |
| 8,302,398 B2* | 11/2012 | Vuk | ........................ | F02B 41/10 180/382 |
| 8,584,460 B2* | 11/2013 | Mardberg Jozsa | ... | B60W 10/06 60/286 |

\* cited by examiner

-- PRIOR ART --

-- PRIOR ART --

-- PRIOR ART --

-- PRIOR ART --

TURBO COMPOUND SYSTEM FOR VEHICLE

CROSS-REFERENCE TO RELATED APPLICATION

This Application is a Section 371 National Stage Application of International Application No. PCT/KR2013/000587, filed Jan. 25, 2013 and published, not in English, as WO 2013/111980 on Aug. 1, 2013.

FIELD OF THE DISCLOSURE

The present disclosure relates to a turbo compound system for a vehicle which recovers emission gas energy of an engine, and more particularly, to a turbo compound system for a vehicle which may recover emission gas energy and provide energy to various auxiliary devices for a vehicle in various forms.

In addition, the present disclosure relates to a turbo compound system for a vehicle in which recovered emission gas energy transferred directly to auxiliary devices for a vehicle, thereby preventing deterioration of fuel efficiency or output reduction, and simplifying facility and control.

In addition, the present disclosure relates to a turbo compound system for a vehicle which variably controls power, which is transferred to auxiliary devices for a vehicle, in response to a situation in which energy of emission gas is varied based on an operational condition of an engine, thereby assuring operational stability.

BACKGROUND OF THE DISCLOSURE

In general, in order to improve fuel efficiency of an engine that uses hydrocarbon fuel, technical improvement about an engine, an accessory device, friction, and the like is mainly performed at a power generation step through weight reduction, a turbocharger, a fuel injection system, a cooling system, and down-sizing.

However, in recent years, researches and developments are actively conducted on a technology that recovers waste energy, which is wasted through emission gas, an engine coolant, and the like, and converts the waste energy into electrical energy or mechanical energy after the power generation step.

The main reason why interests are focused on the technology of recovering waste energy is that an amount of energy wasted from an engine is still considerable even though the engine has high efficiency, and it is determined that technical developments on combustion devices and engine peripheral devices for improving fuel efficiency have somewhat reached the limit.

That is, the reason is that referring to energy balance of a diesel engine for a large-scale and commercial truck as an example of an engine having improved efficiency, maximum energy conversion efficiency of fuel is merely 42%, remaining 31% is wasted in the form of mechanical friction and cooling loss, and remaining 27% is wasted in the form of exhaust energy, and as a result, the technology still cannot overcome the limit.

Accordingly, as technologies of improving fuel efficiency utilizing waste energy, which are most actively researched at present, there are the turbo compound technology which recovers kinetic energy of engine emission gas, and the thermo-electric generator technology and the Rankine steam cycle technology which recover thermal energy from emission gas, engine coolant, and the like.

Among the technologies, only the turbo compound technology is actually applied to several medium-scale or large-scale trucks, and a turbo compound system has a blow-down turbine, which is further mounted in an engine exhaust system in addition to a turbocharger turbine used for intake air supercharging of fuel air, so as to recover waste energy of emission gas, and is classified into a mechanical type and an electric type in accordance with a manner of transferring energy recovered from the blow-down turbine.

As illustrated in FIG. 1, the mechanical type supplies compressed air for fuel to an engine 10 by operating a turbocharger compressor 12 using a turbocharger turbine 11, which converts emission gas energy of the engine 10 into mechanical work, and particularly, transfers power produced by the blow-down turbine 20 to a crank shaft 40 through a mechanical power transmission device 30a including a transmission 31a and a speed-reducing gear 32a, thereby increasing output of the engine 10 without additional fuel consumption.

As illustrated in FIG. 2, the electric type supplies compressed air to the engine 10 by operating the turbocharger compressor 12 using the turbocharger turbine 11, and particularly, transfers power produced by the blow-down turbine 20 to the crank shaft 40 through an electric power transmission device 30b including a generator 31b, and a motor 32b, thereby converting emission gas energy into electrical energy, and utilizing the electrical energy.

Meanwhile, the related art recycles waste energy of emission gas of the engine 10, as described above, so as to increase output of the crank shaft 40, and as illustrated in FIG. 3, compresses a refrigerant by connecting a compressor of an air conditioner 50 for a vehicle and the crank shaft 40 through a belt (not illustrated) and the like in a direct contact manner, and by operating the compressor.

Therefore, since a part of power of the crank shaft 40 is used for the compressor, when the air conditioner 50 is operated when the vehicle is driven, additional fuel is consumed in order to maintain the same output, and thereby, there are problems in that fuel efficiency deteriorated like the related art, and output is decreased when the same amount of fuel is consumed.

In addition, the vehicle including the engine 10 is tuned in order to meet emission gas regulation and fuel efficiency target values when the vehicle is developed, but additional tuning and building of control logic need to be performed to prepare for a situation when the air conditioner 50 is operated, and thus considerable cost is required, and due to technical difficulty in applying mass production of a tuning technology, emission gas frequently exceeds an allowable value defined by the regulation when the air conditioner 50 is operated.

In addition, as illustrated in FIG. 4, in the related art, auxiliary machinery 60 such as a coolant pump 61, a fuel pump 62, and a fuel fan (or a cooling fan) 63, which assists driving of the engine 10, is also connected to the crank shaft 40 and operated, and thus, as described above, there are problems in that additional fuel is consumed in order to maintain output of the crank shaft 40 when the auxiliary machinery 60 is operated, and thereby, fuel efficiency deteriorates.

The discussion above is merely provided for general background information and is not intended to be used as an aid in determining the scope of the claimed subject matter.

SUMMARY

This summary and the abstract are provided to introduce a selection of concepts in a simplified form that are further described below in the Detailed Description. The summary and the abstract are not intended to identify key features or essential features of the claimed subject matter, nor are they intended to be used as an aid in determining the scope of the claimed subject matter.

The present disclosure has been suggested to resolve the aforementioned problem, and provides a turbo compound system for a vehicle which may recover emission gas energy of an engine and provide the energy to various auxiliary devices for a vehicle in various forms.

In addition, the present disclosure provides a turbo compound system for a vehicle in which recovered emission gas energy is transferred directly to auxiliary devices for a vehicle without passing through a crank shaft for a vehicle, thereby preventing deterioration of fuel efficiency or output reduction, and simplifying facility and control.

In addition, the present disclosure provides a variable control type turbo compound system for a vehicle in which variably controls power, which is transferred to auxiliary devices for a vehicle, in response to a situation in which energy of emission gas is varied based on an operational condition of an engine, thereby assuring operational stability.

In addition, a bypass line is configured at front and rear sides of a blow-down turbine, a bypass valve is installed at an upstream portion of the bypass line, and a bypass flow rate is adjusted based on an operational condition, thereby allowing a turbo compound system to output optimum efficiency in wide operational regions.

In addition, an actuator is installed between a speed-reducing gear and a crank shaft, and connection of the crank shaft and the speed-reducing gear is selectively released based on an operational condition, thereby improving efficiency of an engine.

To this end, a turbo compound system for a vehicle according to the present disclosure includes: an engine which is an internal combustion engine; a blow-down turbine which is installed at an emission gas discharge side of the engine, and recovers waste energy by converting energy of the emission gas into mechanical work; a power transmission device which is connected to the blow-down turbine and operated; and an auxiliary device for a vehicle which is supplied with power directly from the power transmission device without passing through a crank shaft for a vehicle and operated.

In this case, it is preferable that the auxiliary device for a vehicle is an air conditioner, and the air conditioner is operated by the power transmission device so as to form a refrigerant cycle.

In addition, it is preferable that the auxiliary device for a vehicle is auxiliary machinery (auxiliary machine) of the engine, and the auxiliary machinery is operated by the power transmission device so as to assist driving of the engine.

In addition, it is preferable that the power transmission device is a mechanical power transmission device which includes a transmission installed at an output side of the blow-down turbine, and a speed-reducing gear installed at an output side of the transmission.

In addition, it is preferable that the power transmission device is an electric power transmission device which includes a generator installed at an output side of the blow-down turbine, and a motor installed at an output side of the generator.

In addition, the turbo compound system further includes: the crank shaft 140 which is rotated by the engine 110; and a control unit which controls power, respectively, which is transfers from the crank shaft 140 and the power transmission device 130a and 130b to the auxiliary device for a vehicle based on an operational condition of the engine 110, in which the auxiliary device 150 and 160 for a vehicle is connected to each of the crank shaft 140 and the power transmission device 130a and 130b so as to be driven by receiving power from the crank shaft 140 and the power transmission device 130a and 130b.

In addition, the crank shaft 140 is connected to the auxiliary device 150 for a vehicle through a first actuator (Actuator 1), the blow-down turbine 120 is connected to the power transmission device 130a and 130b through a second actuator (Actuator 2), the power transmission device 130a and 130b is connected to the auxiliary device 150 for a vehicle through a third actuator (Actuator 3), and the control unit controls each of the connection states of the first actuator (Actuator 1) to the third actuator (Actuator 3).

In addition, the turbo compound system further includes: a bypass line 170 which is provided to bypass emission gas, which flows into the blow-down turbine 120, based on an operational condition of the engine 110; and a bypass valve 171 which is provided at an upstream portion of the bypass line 170 so as to control a flow of emission gas.

In addition, the turbo compound system further includes a first control unit which controls the bypass valve 171 based on an operational condition of the engine 110.

In addition, an actuator 180, which makes and releases engagement of the crank shaft 140 and the speed-reducing gear 132a, is provided between the crank shaft 140 and the speed-reducing gear 132a.

In addition, the turbo compound system further includes a second control unit which controls the actuator 180 based on an operational condition of the engine 110.

In addition, the first control unit divides a case in which the engine 110 is in a low-speed and low-load operational state and a case in which the engine 110 is in a high-speed and high-load operational state, and controls the bypass valve.

In addition, the second control unit divides a case in which the engine 110 is in a low-speed and low-load operational state and a case in which the engine 110 is in a high-speed and high-load operational state, and controls the actuator 180.

According to the turbo compound system for a vehicle according to the present disclosure, which is described above, emission gas energy of the engine is recovered, thereby being provided in various forms to various auxiliary devices for a vehicle including the air conditioner for a vehicle or the auxiliary machinery which assists driving of the engine.

In addition, according to the present disclosure, recovered emission gas energy is transferred directly to the auxiliary devices for a vehicle without passing through the crank shaft for a vehicle, thereby preventing deterioration of fuel efficiency or output reduction, and simplifying facility and control.

In addition, according to the variable control type turbo compound system for a vehicle according to the present disclosure, power, which is transferred from the crank shaft and the power transmission device to the auxiliary devices for a vehicle, is variably controlled, respectively, based on an operational condition of the engine, thereby improving operational stability of the system.

In addition, according to the turbo compound system according to the present disclosure, a flow rate of emission gas, which flows into the blow-down turbine, is bypassed based on an operational condition of the engine, thereby resolving a problem of an increase in emission gas pressure, and preventing a loss of thermal energy.

In addition, according to the turbo compound system according to the present disclosure, the connection between the crank shaft and the speed-reducing gear is controlled based on an operational condition of the engine, thereby resolving a problem of deterioration of fuel efficiency of the engine.

DESCRIPTION OF THE DRAWINGS

Figure 1:
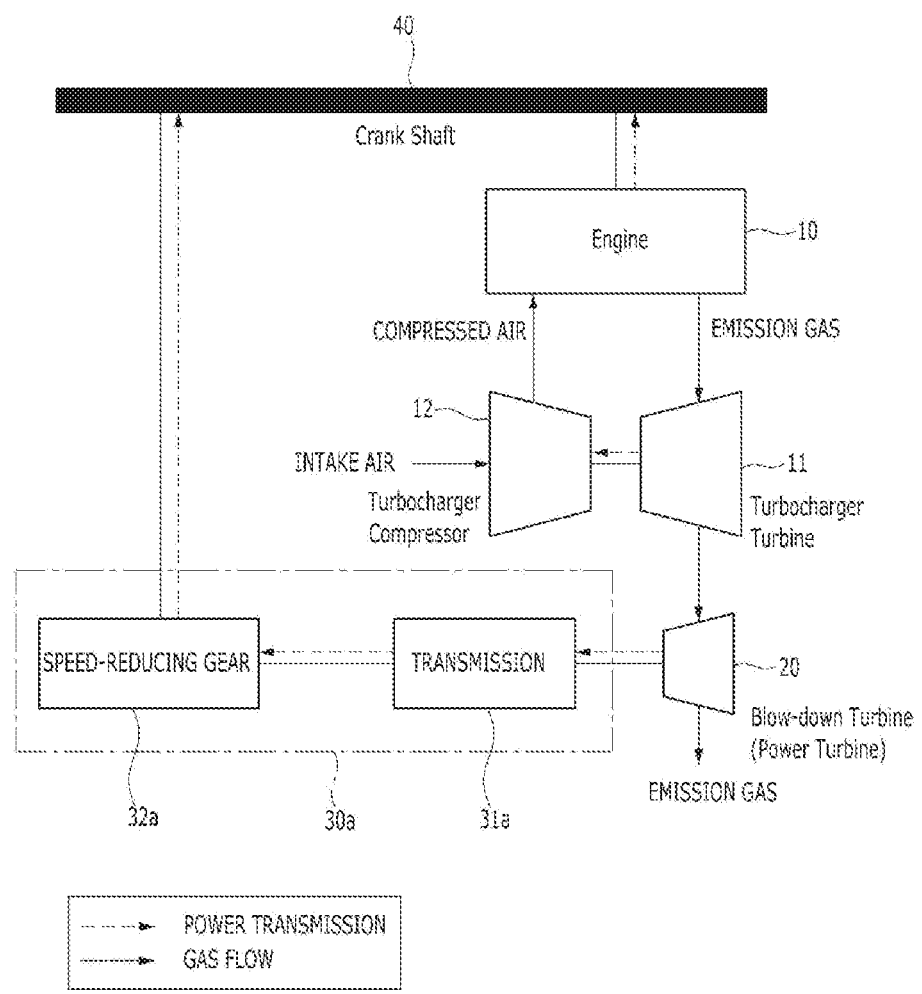
FIG. 1 is a schematic view illustrating a mechanical turbo compound system according to the related art.
Figure 2:
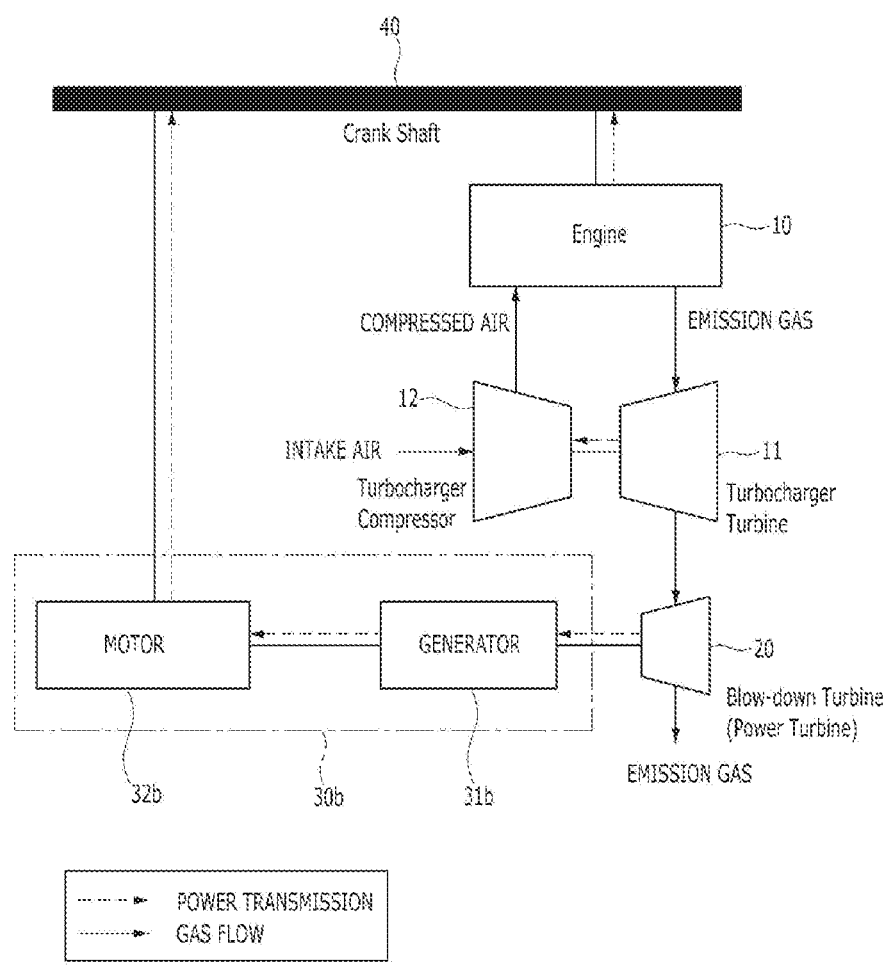
FIG. 2 is a schematic view illustrating an electric turbo compound system according to the related art.
Figure 3:
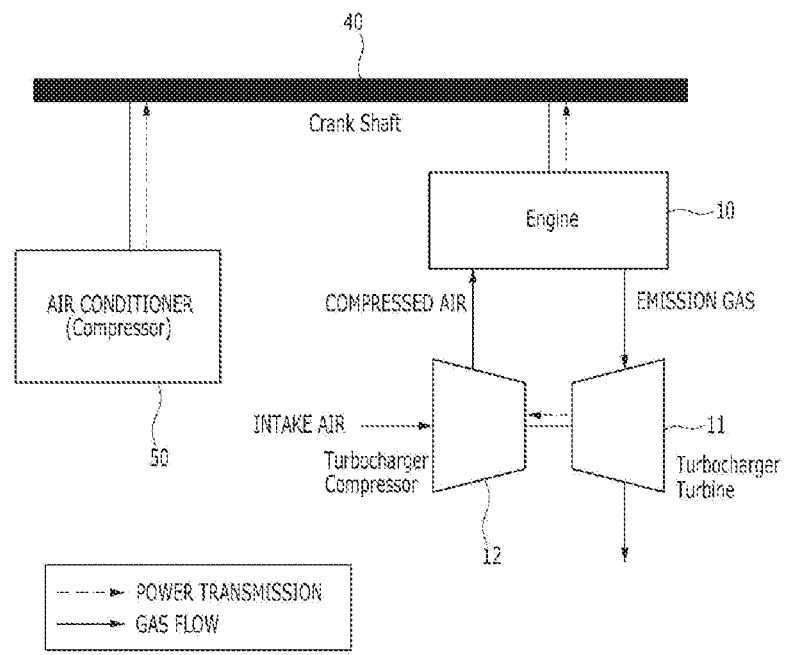
FIG. 3 is an example illustrating an example of using recovered energy of the turbo compound system according to the related art.
Figure 4:
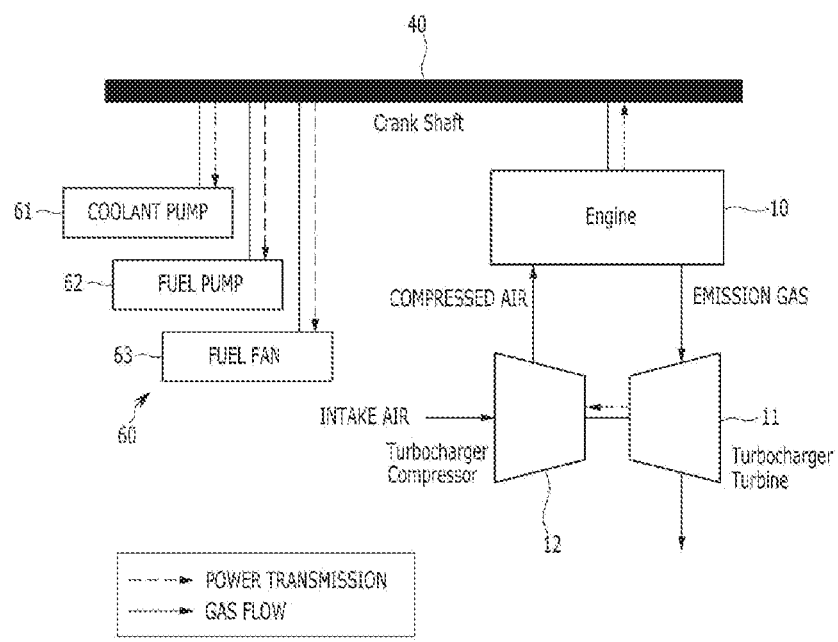
FIG. 4 is another example illustrating an example of using recovered energy of the turbo compound system according to the related art.

110: Engine
111: Turbocharger turbine
112: Turbocharger compressor
120: Blow-down turbine
130a: Mechanical power transmission device
131a: Transmission
132a: Speed-reducing gear
130b: Electric power transmission device
131b: Generator
132b: Motor
140: Crank shaft
150, 160: Auxiliary device for vehicle
150: Air conditioner
160: Auxiliary machinery

DETAILED DESCRIPTION

Hereinafter, a turbo compound system for a vehicle according to an exemplary embodiment of the present disclosure will be described in detail with reference to the accompanying drawings.

However, a blow-down turbine, which will be described below, is also referred to as a power turbine, and despite the difference in terminology, it is obvious that the blow-down turbine and the power turbine are the same configuration.

Figure 5:
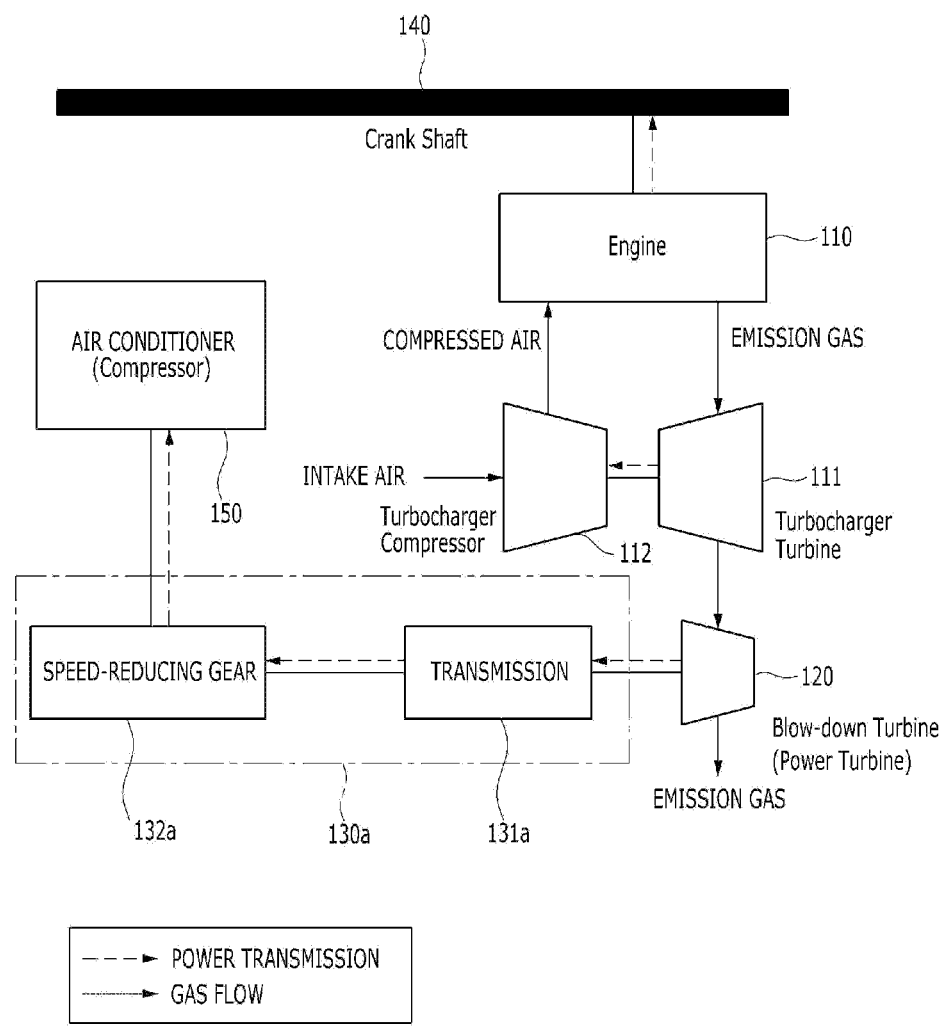
FIG. 5 is an exemplary embodiment illustrating a mechanical turbo compound system for a vehicle according to the present disclosure.

As illustrated in FIG. 5, a turbo compound system for a vehicle according to the present disclosure includes an engine 110 which is an internal combustion engine, a blow-down turbine 120 which is installed at an emission gas discharge side of the engine 110 and recovers waste energy by converting energy of emission gas into mechanical work, a power transmission device 130a which is connected to the blow-down turbine 120 and operated, and an auxiliary device 150 for a vehicle which is supplied with power directly from the power transmission device 130a and operated.

In addition, as necessary, the turbo compound system further includes a turbocharger turbine 111 which is installed at the emission gas discharge side of the engine 110 and converts energy of emission gas into mechanical work, and a turbocharger compressor 112 which is operated by the turbocharger turbine 111, compresses air for fuel, and supercharges the compressed air into the engine 110, and the turbo compound system may supply air for fuel using waste energy like the related art.

In this case, as the power transmission device 130a of the turbo compound system for a vehicle, for example, a mechanical power transmission device 130a, which includes a transmission 131a that is installed at an output side of the blow-down turbine 120, and a speed-reducing gear 132a that is installed at an output side of the transmission 131a so as to transfer power to the auxiliary device 150 for a vehicle, is used.

There are two types of methods for the transmission 131a, such as a method of using a fluid and a direct contact type, and even though any one of the two types may be used, when the fluid type is used through a fluid coupling and the like, power transmission efficiency is slightly lower in comparison with the direct contact type, but matching development and control are easy, and system implementation performance is high.

In addition, as the auxiliary device 150 for a vehicle, which is used to recover and recycle waste energy of emission gas, various components of a vehicle may be used as long as the components may recover and recycle waste energy, except for the crank shaft 140 that has a high power load and is a subject to be essentially controlled in a vehicle. Particularly, the auxiliary device 150 for a vehicle is preferably an air conditioner 150 which greatly affects fuel consumption while being operated when the vehicle runs.

In addition, the air conditioner 150 is operated by the mechanical power transmission device 130a so as to form a refrigerant cycle, and generally includes a compressor, a condenser, an expansion valve, an evaporator, and the like, such that for example, when the compressor is operated by the blow-down turbine 120, a motor for compression may be operated by the blow-down turbine 120 so as to compress a refrigerant. Of course, it is obvious that the condenser, the expansion valve, and the evaporator may also be operated by the blow-down turbine 120 in addition to the compressor.

Therefore, because the present disclosure may operate the compressor of the air conditioner 150 using the blow-down turbine 120 that converts waste energy of emission gas into mechanical work, waste energy may be utilized for the auxiliary device 150 for a vehicle, and the compressor is operated using waste energy without additional fuel consumption, thereby preventing fuel efficiency from deteriorating.

In addition, in the related art, waste energy is first transferred to the crank shaft 140, and thereafter, the compressor is operated by the crank shaft 140, whereas in the present disclosure, mechanical work of the blow-down turbine 120 is directly transferred to the compressor without passing through the crank shaft 140, thereby preventing output of the crank shaft 140 from being reduced when the air conditioner 150 is operated.

In addition, since the compressor is independently operated by the blow-down turbine 120, when the vehicle is tuned in order to meet emission gas regulation and fuel efficiency target values when the vehicle is developed, additional tuning for preparing for a situation when the air conditioner 150 is operated and related control logic become extraordinarily simplified or unnecessary, thereby saving development costs and period, and preventing a problem that emission gas exceeds an allowed value, which may occur when the air conditioner 150 is operated.

Meanwhile, the air conditioner 150, particularly, the compressor is exemplified above as the auxiliary device 150 for a vehicle that is used to recover and recycle waste energy of emission gas, and the mechanical power transmission device 130*a*, which includes the transmission 131*a* and the speed-reducing gear 132*a*, is exemplified as the power transmission device 130*a*.

Figure 6:
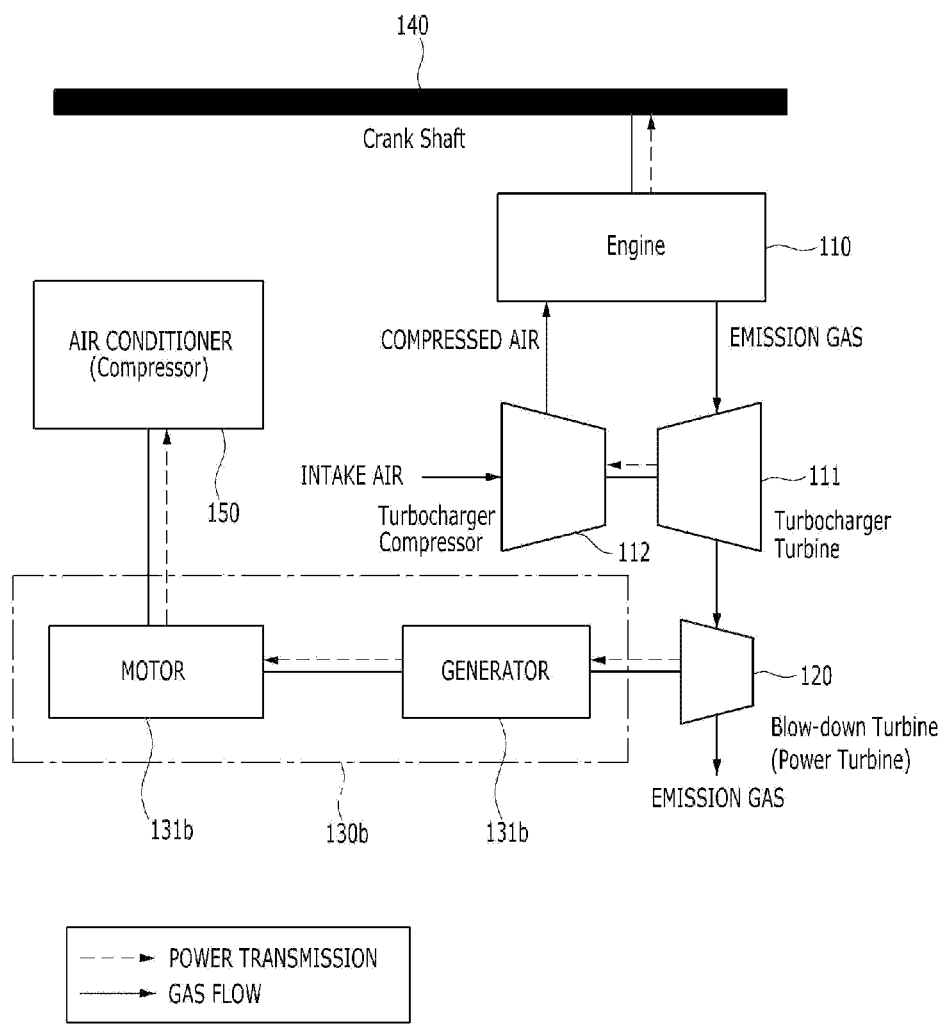
FIG. 6 is an exemplary embodiment illustrating an electric turbo compound system for a vehicle according to the present disclosure.

However, as illustrated in FIG. 6, as the power transmission device which transfers mechanical work generated in the blow-down turbine 120 to the air conditioner 150, an electric power transmission device 130*b* may also be used, and the electric power transmission device 130*b* converts waste energy into electrical energy, and thereafter, allows the air conditioner 150 to be operated.

To this end, the electric power transmission device 130*b* includes a generator 131*b* which is installed at an output side of the blow-down turbine 120, and a motor 132*b* which is installed at an output side of the generator 131*b* and operated by generated electric power, and power of the motor 132*b*, which is operated by generated electric power, is transferred to the air conditioner 150 so as to operate the compressor and the like.

Therefore, in the present disclosure, like the mechanical type as described above, waste energy may be utilized for the auxiliary device 150 for a vehicle without additional fuel consumption, output of the crank shaft 140 is prevented from being reduced when the air conditioner 150 is operated, and additional tuning and related control logic are extraordinarily simplified.

In addition, generated electric power of the generator 131*b* is additionally used to charge a battery (not illustrated) of the vehicle so as to start the vehicle, or generated electric power is directly supplied to various electric devices (not illustrated) such as a lighting device or a display device for a vehicle, so as to be utilized in additional various forms, and even though system costs are high compared to the mechanical type, high efficiency may be maintained in a wider operational range.

Hereinafter, a turbo compound system for a vehicle according to another exemplary embodiment of the present disclosure will be described with reference to the accompanying drawings.

Another exemplary embodiment of the present disclosure is the same as the exemplary embodiment of the present disclosure described above, except that the auxiliary device for a vehicle, which recycles recovered waste energy, is auxiliary machinery that assists driving of the engine. Thus, hereinafter, a duplicated description will be omitted if possible.

Figure 7:
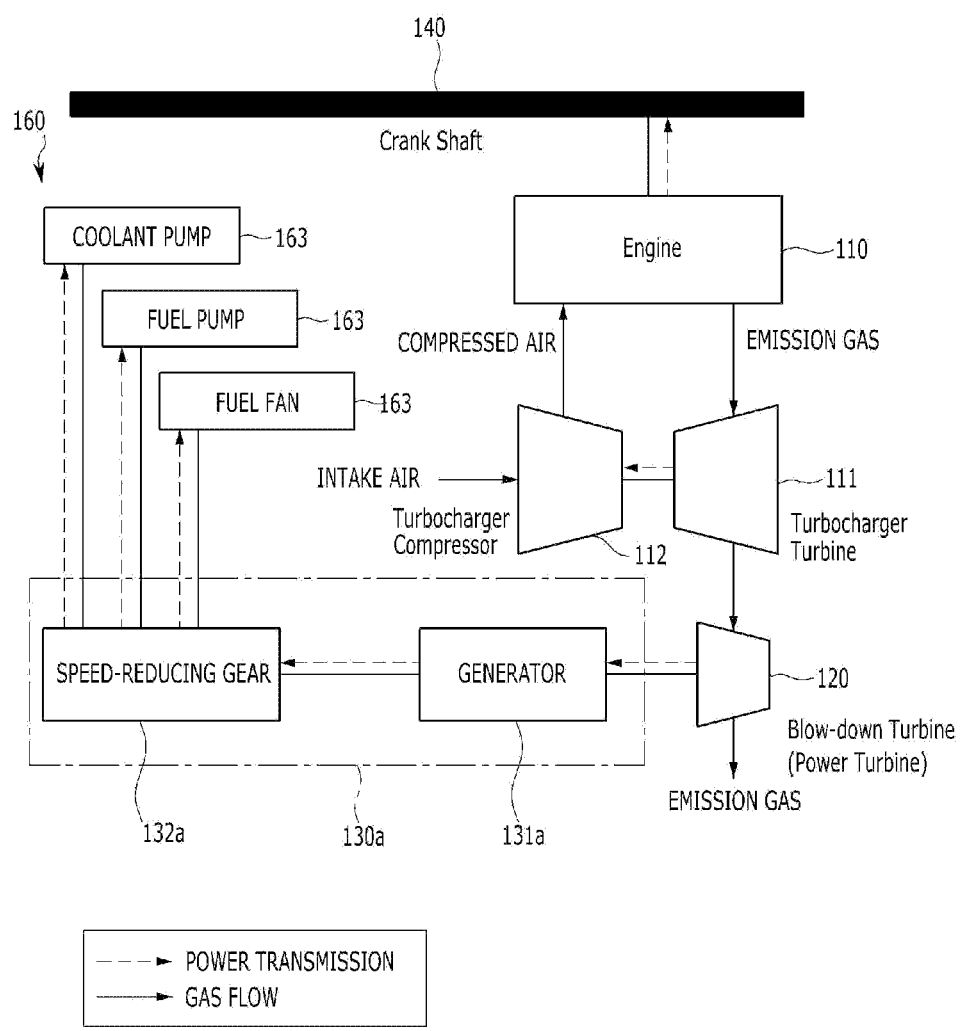
FIG. 7 is another exemplary embodiment illustrating a mechanical turbo compound system for a vehicle according to the present disclosure.

As illustrated in FIG. 7, a turbo compound system for a vehicle according to the present disclosure includes an engine 110 which is an internal combustion engine, a blow-down turbine 120 which recovers waste energy by converting energy of emission gas into mechanical work, a power transmission device 130*a* which is connected to the blow-down turbine 120 and operated, and an auxiliary device 160 for a vehicle which is supplied with power directly from the power transmission device 130*a* and operated.

In addition, as necessary, the turbo compound system may further include a turbocharger turbine 111 which converts energy of emission gas into mechanical work, and a turbocharger compressor 112 which is operated by the turbocharger turbine 111, compresses air for fuel, and supercharges the compressed air into the engine 110.

In this case, as the power transmission device 130*a* of the turbo compound system for a vehicle, for example, a mechanical power transmission device 130*a*, which includes a transmission 131*a* that is installed at an output side of the blow-down turbine 120, and a speed-reducing gear 132*a* that is installed at an output side of the transmission 131*a* so as to transfer power to the auxiliary device 150 for a vehicle, is used.

In addition, the auxiliary device 160 for a vehicle, which is used to recover and recycle waste energy of emission gas, is auxiliary machinery 160 (simply referred to as 'auxiliary machine'), such as a coolant pump 161, a fuel pump 162, a fuel fan 163, and the like, which assists driving of the engine 110.

Therefore, because the present disclosure may operate the auxiliary machinery 160, respectively, using the blow-down turbine 120, waste energy may be utilized for the auxiliary device 160 for a vehicle, and the auxiliary machinery 160 is operated using waste energy without additional fuel consumption, thereby preventing fuel efficiency from deteriorating.

In addition, in the present disclosure, mechanical work of the blow-down turbine 120 is directly transferred to the auxiliary machinery 160 without passing through the crank shaft 140, thereby preventing output of the crank shaft 140 from being reduced when the auxiliary machinery 160 is operated.

In addition, since the auxiliary machinery 160 is independently operated by mechanical work of the blow-down turbine 120, when the vehicle is tuned at a step of developing the vehicle, additional tuning prepared for when the auxiliary machinery 160 is operated and related control logic become extraordinarily simplified or unnecessary.

Figure 8:
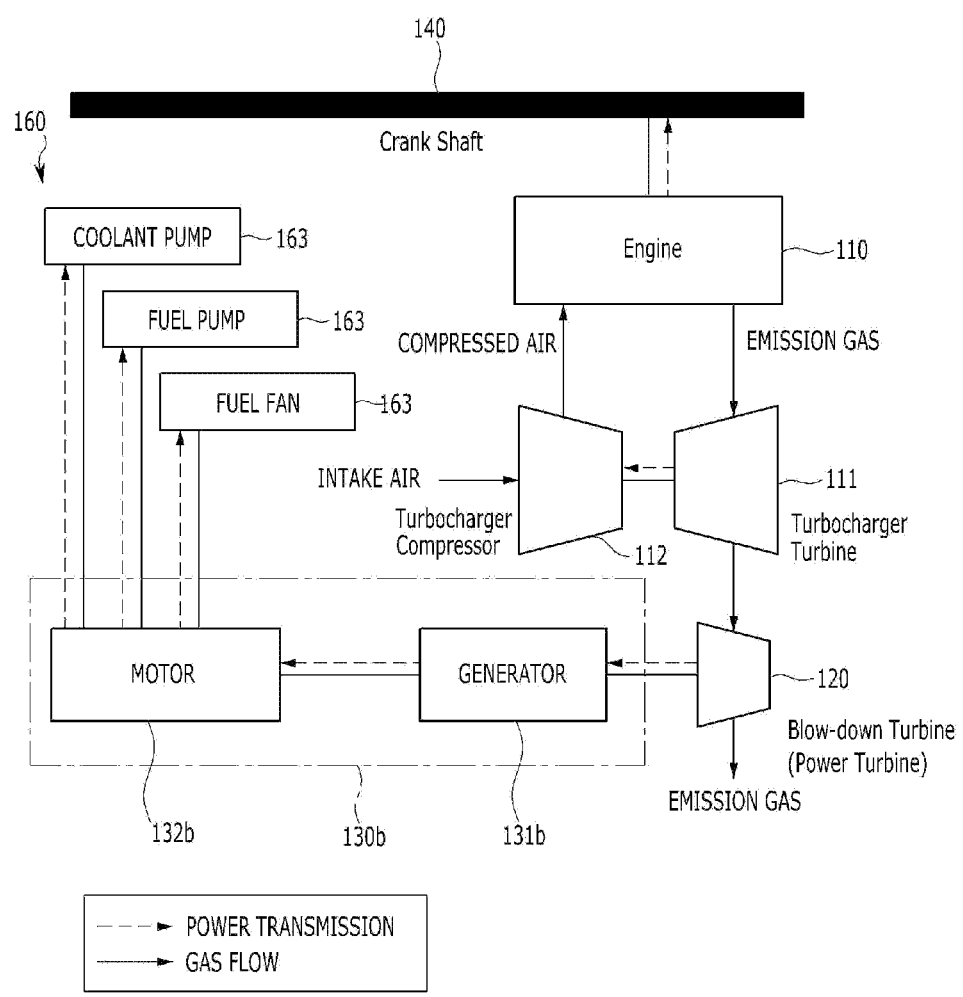
FIG. 8 is another exemplary embodiment illustrating an electric turbo compound system for a vehicle according to the present disclosure.

Meanwhile, as illustrated in FIG. 8, as the power transmission device which transfers mechanical work generated in the blow-down turbine 120 to the auxiliary machinery 160, an electric power transmission device 130*b* may also be used, and the electric power transmission device 130*b* converts waste energy into electrical energy, and thereafter, operates the auxiliary machinery 160.

To this end, the electric power transmission device 130*b* includes a generator 131*b* which is installed at an output side of the blow-down turbine 120, and a motor 132*b* which is installed at an output side of the generator and operated by generated electric power, and the auxiliary machinery 160 is operated by power of the motor 132b which is operated by generated electric power.

Therefore, in addition to the advantage of the mechanical power transmission device 130a that is described above, the present disclosure may charge a battery with generated electric power of the generator 131b, or directly supplies generated electric power to various electric devices such as a lighting device or a display device for a vehicle, thereby further increasing utilization.

Figure 9:
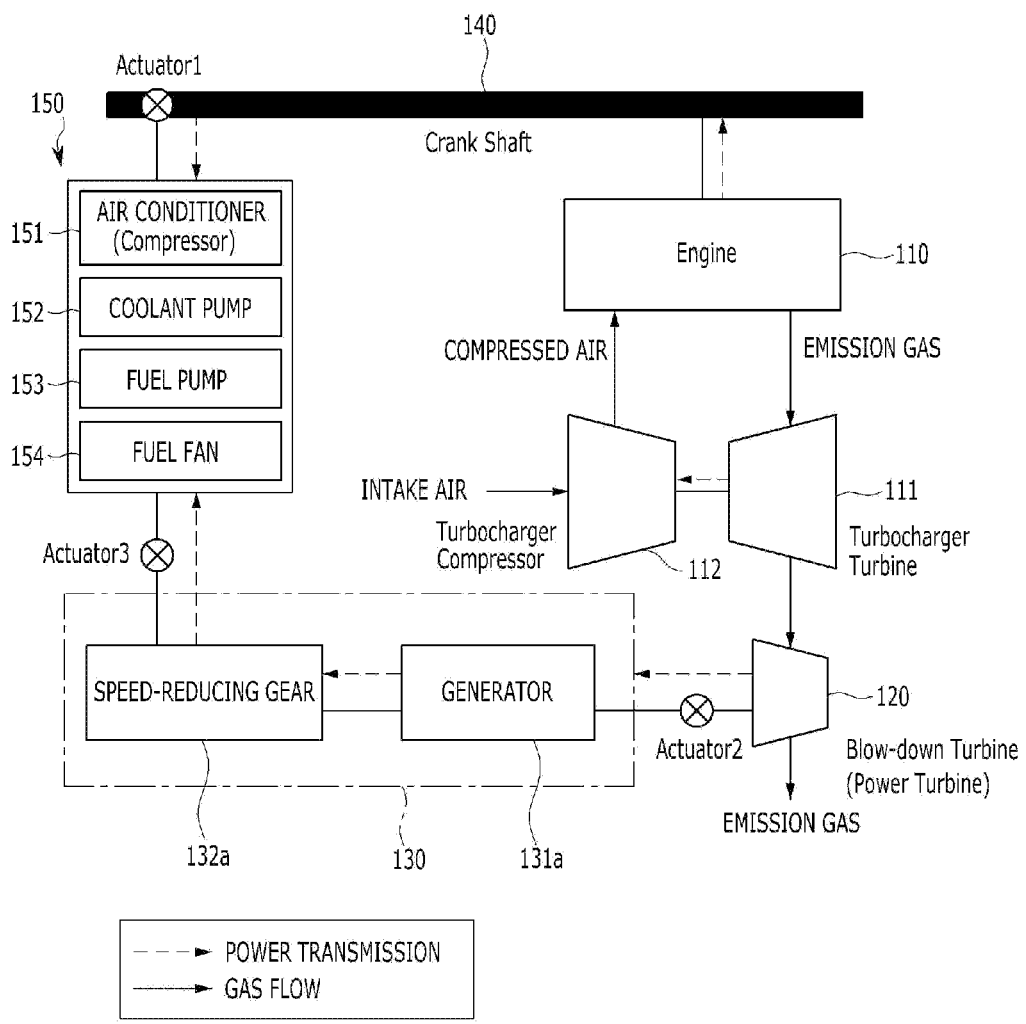
FIG. 9 is an exemplary embodiment illustrating a variable control type turbo compound system according to the present disclosure.
Figure 10:
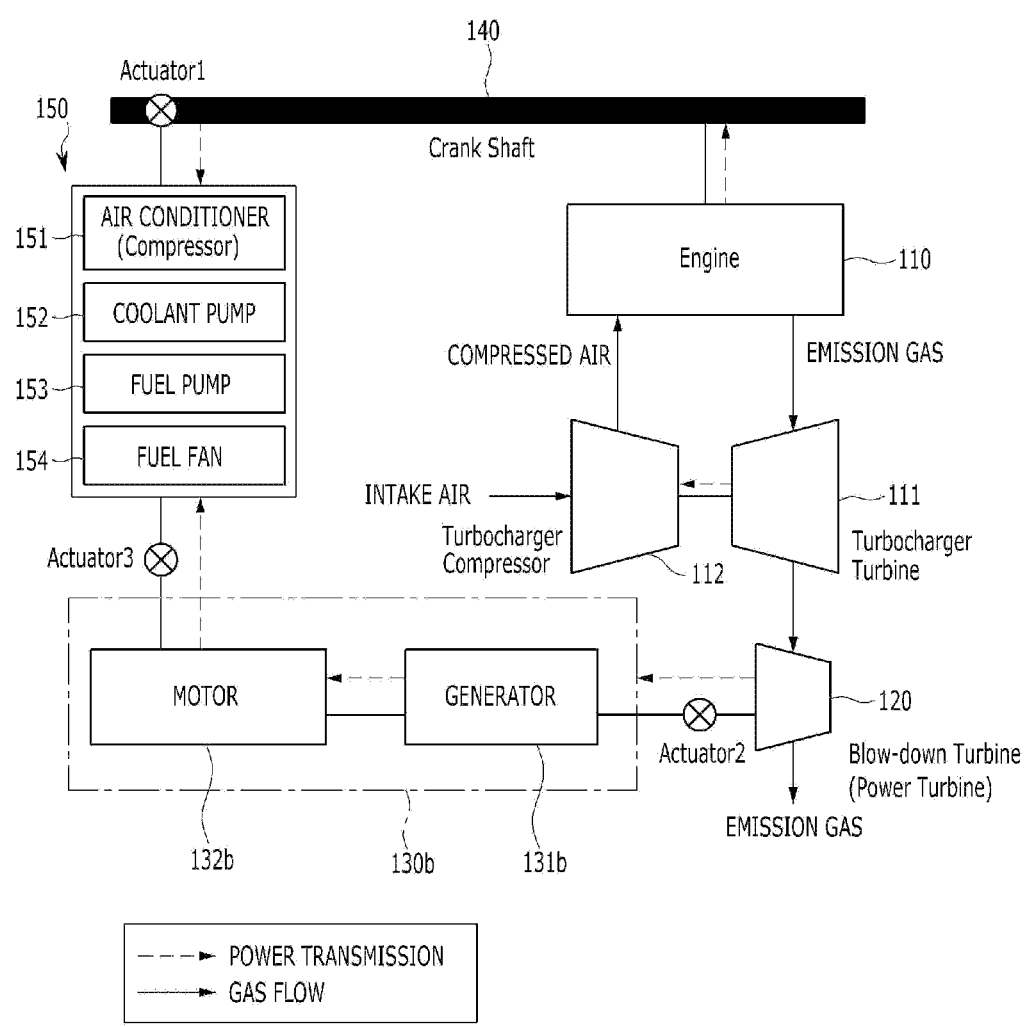
FIG. 10 is another exemplary embodiment illustrating a variable control type turbo compound system according to the present disclosure.

As illustrated in FIGS. 9 and 10, a variable control type turbo compound system for a vehicle according to the present disclosure includes an engine 110 which is an internal combustion engine, a blow-down turbine 120 which is installed at an emission gas discharge side of the engine 110, power transmission devices 130a and 130b which are connected to the blow-down turbine 120, a crank shaft 140 which is rotated by the engine 110, an auxiliary device 150 for a vehicle which is driven by receiving power from the crank shaft 140 and the power transmission devices 130a and 130b, and a control unit (not illustrated) which controls power transmitted to the auxiliary device 150 for a vehicle based on an operational condition of the engine 110.

Of course, as necessary, the turbo compound system further includes a turbocharger turbine 111 which is installed at the emission gas discharge side of the engine 110 and converts energy of emission gas into mechanical work, and a turbocharger compressor 112 which is operated by the turbocharger turbine 111, compresses air for fuel, and supercharges the compressed air into the engine 110, and the turbo compound system may supply air for fuel using waste energy like the related art.

According to the aforementioned configuration, waste energy of emission gas is recovered and converted into mechanical work (that is, power generation) in the blow-down turbine 120, power generated in the blow-down turbine 120 is transferred to the auxiliary device 150 for a vehicle through the power transmission devices 130a and 130b, and thereby, the configuration may be used as a configuration that operates the auxiliary device 150 for a vehicle together with the crank shaft 140.

Therefore, emission gas energy of the engine 110 is recovered by the blow-down turbine 120 and provided to the auxiliary device 150 for a vehicle, and thus it is not necessary to consume additional fuel in order to operate the auxiliary device 150 for a vehicle, thereby preventing deterioration of fuel efficiency and output reduction.

Particularly, the auxiliary device 150 for a vehicle is connected to each of the crank shaft 140 and the power transmission devices 130a and 130b so as to be driven by receiving power from the crank shaft 140 and the power transmission devices 130a and 130b, and in this case, the control unit controls power, respectively, which is transferred from the crank shaft 140 and the power transmission devices 130a and 130b to the auxiliary device 150 for a vehicle based on an operational condition of the engine 110, thereby stably operating the turbo compound system.

Meanwhile, for example, as illustrated in FIG. 9, as the power transmission device 130a of the turbo compound system for a vehicle, a mechanical power transmission device 130a, which includes a transmission 131a that is installed at an output side of the blow-down turbine 120, and a speed-reducing gear 132a that is installed at an output side of the transmission 131a so as to transfer power to the auxiliary device 150 for a vehicle, may be used.

There are two types of methods for the transmission 131a, such as a method of using a fluid and a direct contact type, and even though any one of the two types may be used, when the fluid type is used through a fluid coupling and the like, power transmission efficiency is slightly lower in comparison with the direct contact type, but matching development and control are easy, and system implementation performance is high.

In addition, for example, as illustrated in FIG. 10, as the power transmission device 130a of the turbo compound system for a vehicle, an electric power transmission device 130b, which converts waste energy into electrical energy, and thereafter operates the auxiliary device 150 for a vehicle, may also be used.

The electric power transmission device 130b includes a generator 131b which is installed at an output side of the blow-down turbine 120, and a motor 132b which is installed at an output side of the generator 131b, operated by generated electric power, and connected to the auxiliary device 150 for a vehicle.

In the electric power transmission device 130b, generated electric power of the generator 131b is used to charge a battery of the vehicle so as to start the vehicle, or generated electric power is directly supplied to various electric devices such as a lighting device or a display device for a vehicle, so as to be utilized in additional various forms. In addition, even though system costs are high compared to the mechanical type, high efficiency may be maintained in a wider operational range.

In addition, in the present disclosure, as the auxiliary device 150 for a vehicle, which is used to recover and recycle waste energy of emission gas, various component of a vehicle may be used as long as the components may recover and recycle waste energy, except for the crank shaft 140 that has a high power load and is a subject to be essentially controlled in a vehicle.

For example, the auxiliary device 150 for a vehicle is an air conditioner 151 which greatly affects fuel consumption while being operated when the vehicle runs, and the air conditioner 151 includes a compressor, a condenser, an expansion valve, an evaporator, and the like such that when the compressor is operated by the blow-down turbine 120, a motor for compression is operated by the blow-down turbine 120 so as to compress a refrigerant.

Of course, it is obvious that the condenser, the expansion valve, and the evaporator may also be operated by the blow-down turbine 120 in addition to the compressor.

In another example, as the auxiliary device 150 for a vehicle, auxiliary machinery (simply referred to as 'auxiliary machine') such as a coolant pump 152, a fuel pump 153, a fuel fan 154, and the like, which assists driving of the engine 110, may also be used.

In addition, in the present disclosure, the crank shaft 140 is connected to the auxiliary device 150 for a vehicle through a first actuator (Actuator 1), the blow-down turbine 120 is connected to the power transmission devices 130a and 130b through a second actuator (Actuator 2), and the power transmission devices 130a and 130b are connected to the auxiliary device 150 for a vehicle through a third actuator (Actuator 3).

Therefore, an environment is provided to allow each of the crank shaft 140 and the blow-down turbine 120 to operate the auxiliary device 150 for a vehicle, and to allow the control unit to control power transmission of each of the crank shaft 140 and the blow-down turbine 120.

The control unit may be integrally provided in an electronic controller unit (ECU) or an electronic power controller system (EPOS), which is equipped in various vehicles including heavy equipment, or may be modularized and separately provided, and connection states of the first actuator (Actuator 1) to the third actuator (Actuator 3) are controlled by the control unit, respectively.

The connection state is generally divided into 'connection' and 'connection release'. Of course, as necessary, the 'connection' is divided into various steps of 'connections' like an operation of shifting gears so as to adjust torque or speed, which is transferred to the auxiliary device 150 for a vehicle, in several steps, and connection degrees may be controlled, respectively.

In addition, the control unit preferably divides a case in which the engine 110 is in a variable (transient) operational state and a case in which the engine 110 is in the other operational states (for example, a constant-speed operational state), and controls power, respectively, which is transferred from the crank shaft 140 and the power transmission devices 130a and 130b to the auxiliary device 150 for a vehicle.

The blow-down turbine 120 depends on thermal energy of emission gas of engine 110, and in this case, the thermal energy of emission gas is varied based on an operational condition of the vehicle (engine), and when thermal energy of emission gas is varied for every moment under a variable operational condition, power, which is supplied from the blow-down turbine 120 to the auxiliary device 150 for a vehicle, is also varied.

Therefore, in the present disclosure, the case in which the vehicle is in a variable operational state and the case in which the vehicle is in the other operational states are divided, and power, which is transferred from the crank shaft 140 and the power transmission devices 130a and 130b to the auxiliary device 150 for a vehicle, is controlled for each operational state, thereby allowing the turbo compound system to be stably operated.

That is, based on an operational condition of the engine 110, using the control unit, the present disclosure operates the auxiliary device 150 for a vehicle through both the crank shaft 140 and the power transmission devices 130a and 130b, or operates the auxiliary device 150 for a vehicle through any one of the crank shaft 140 and the power transmission devices 130a and 130b, thereby allowing the turbo compound system to be always and stably operated.

For example, in the case of the variable operational state, the first actuator (Actuator 1) is connected to the auxiliary device 150 for a vehicle so as to operate the auxiliary device 150 for a vehicle only through the crank shaft 140, and the connections of the second actuator (Actuator 2) and the third actuator (Actuator 3) to the auxiliary device 150 for a vehicle are released.

In addition, in the case of the constant-speed operational state, the connection of the first actuator (Actuator 1) to the auxiliary device 150 for a vehicle is released so as to operate the auxiliary device 150 for a vehicle only through the blow-down turbine 120, and the second actuator (Actuator 2) and the third actuator (Actuator 3) are connected to the auxiliary device 150 for a vehicle.

In addition, when the connection states between the power transmission devices 130a and 130b and the auxiliary device 150 for a vehicle are controlled, both the second actuator (Actuator 2) and the third actuator (Actuator 3) may be connected to or disconnected from the auxiliary device 150 for a vehicle as described above, but additionally, the second actuator (Actuator 2) may be controlled so as to be connected to the auxiliary device 150 for a vehicle, and the third actuator (Actuator 3) may be controlled so as to be disconnected from the auxiliary device 150 for a vehicle.

When the second actuator (Actuator 2) is connected, and the third actuator (Actuator 3) is disconnected by the control unit, particularly, in a case in which the electric power transmission device 130b is used, an electric power generation state is maintained by connecting the blow-down turbine 120 and the generator 131a by the second actuator (Actuator 2) such that a battery for a vehicle may be charged with generated electric power of the generator 131a, and electric power may be supplied to various electric devices, thereby increasing a waste energy recovery rate.

Figure 11:
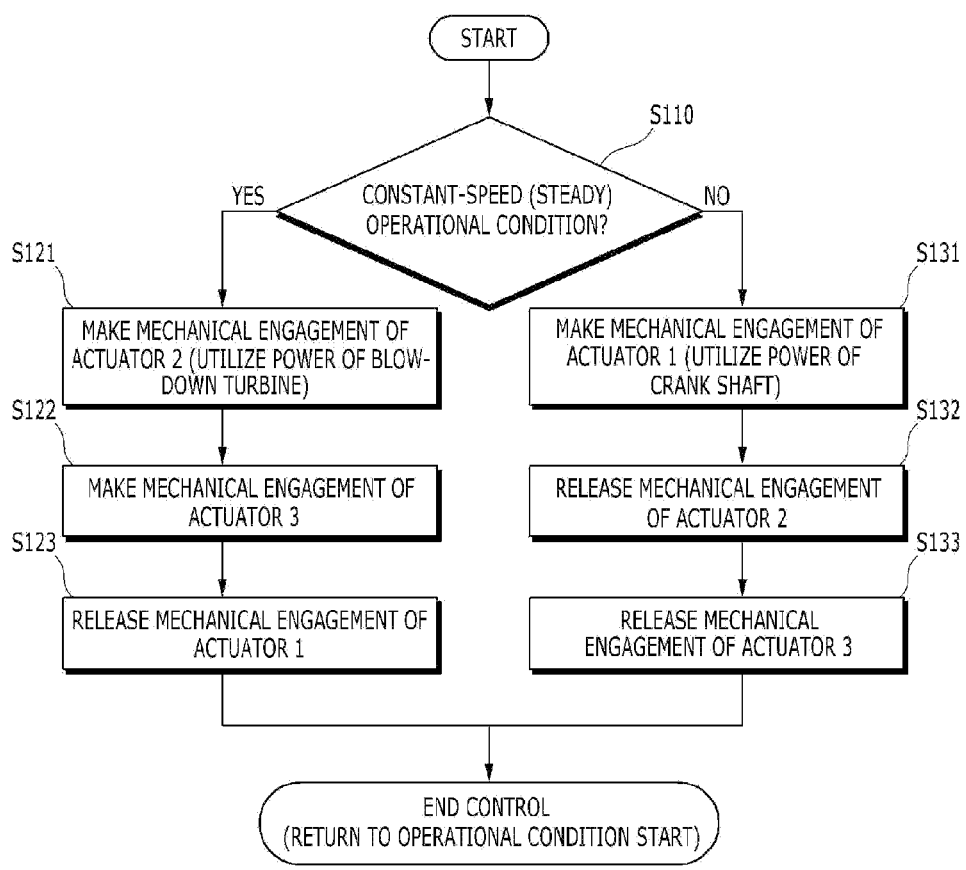
FIG. 11 is a flow chart illustrating a method of operating the variable control type turbo compound system according to the present disclosure.

Hereinafter, a method of operating the variable control type turbo compound system according to the present disclosure will be described with reference to FIG. 11.

First, when an operation starts, the control unit monitors an operational state of the vehicle (engine), and determines whether the operational state is the constant-speed operational state (S110). In addition to a manner in which the monitoring of the operational state is directly performed by the control unit, a manner in which the monitoring of the operation state is performed by the ECU or the EPOS, and thereafter a result thereof is provided to the control unit may also be used.

As a result of monitoring the operational state, when the operational state is the constant-speed operational state, under control of the control unit, the second actuator (Actuator 2) and the third actuator (Actuator 3) are connected to an accessory device for a vehicle (S121 and S122), and the connection of the first actuator (Actuator 1) to the accessory device for a vehicle is released (S123).

Therefore, the accessory device for a vehicle is operated only through the blow-down turbine 120, thereby operating the accessory device for a vehicle without additional fuel consumption.

In contrast, as a result of monitoring the operational state, when the operational state is not the constant-speed operational state, it is determined that the operational state is the variable operational state, and under control of the control unit, the first actuator (Actuator 1) is connected to the accessory device for a vehicle (S131), and the connections of the second actuator (Actuator 2) and the third actuator (Actuator 3) to the accessory device for a vehicle are released (S132 and S133).

Therefore, the accessory device for a vehicle is operated only through the crank shaft 140, thereby preventing an operation of the turbo compound system from becoming unstable due to variation in the emission gas energy.

Of course, in addition to the case in which the accessory device for a vehicle is operated only through the blow-down turbine 120, or the accessory device for a vehicle is operated only through the crank shaft 140, it is obvious that although not illustrated, based on operational states that may be varied in additional various forms, the accessory device for a vehicle may be simultaneously operated through both the blow-down turbine 120 and the crank shaft 140, and in this case, each connection degree may be controlled so as to be minutely adjusted for each step.

Figure 12:
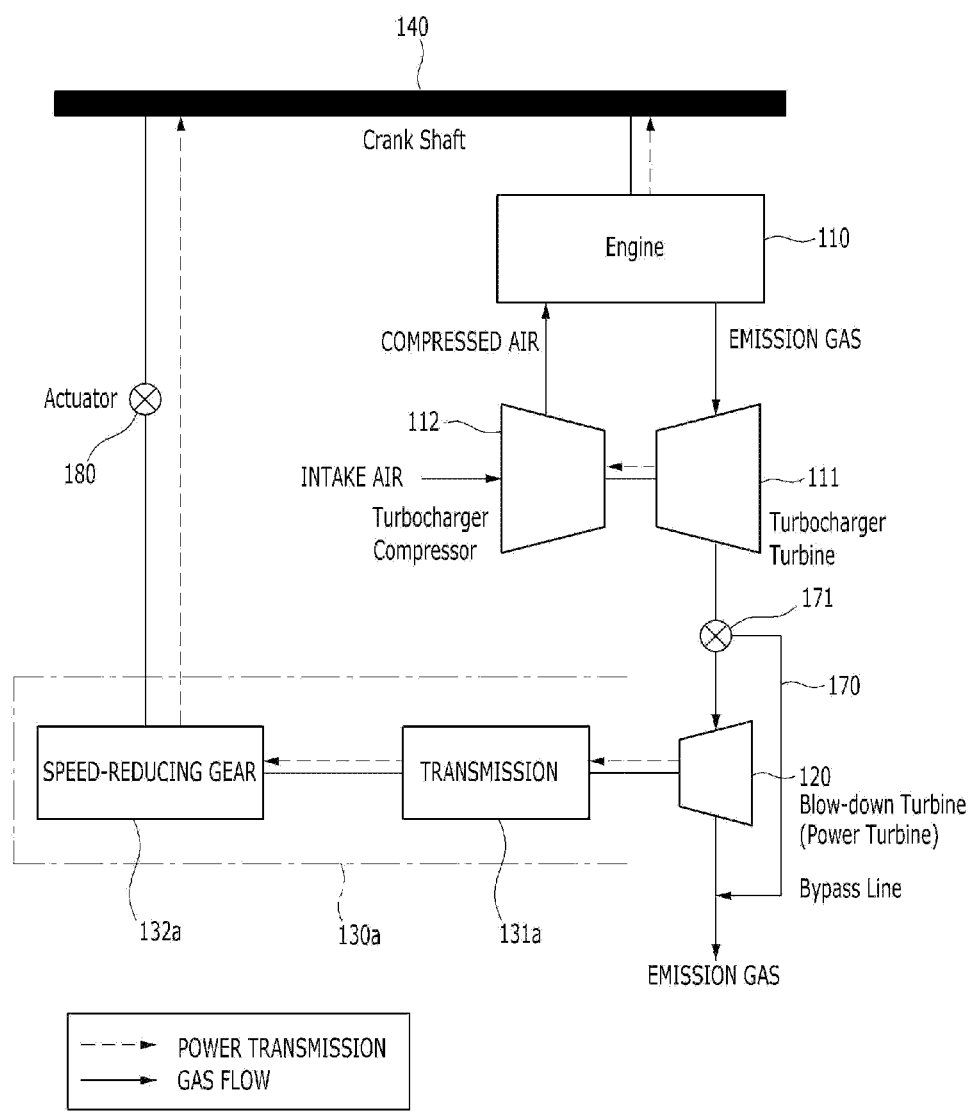
FIG. 12 is yet another exemplary embodiment illustrating a mechanical turbo compound system according to the present disclosure.

As illustrated in FIG. 12, a turbo compound system according to the present disclosure includes an engine 110 which is an internal combustion engine, a blow-down turbine 120 which is installed at an emission gas discharge side of the engine 110, a power transmission device 130a which is connected to the blow-down turbine 120, a crank shaft 140 which is rotated by the engine 110, a bypass line 170 which is provided to bypass emission gas, which flows into the blow-down turbine 120, based on an operational condition of the engine 110, and a bypass valve 171 which is provided at an upstream portion of the bypass line 170 so as to control a flow of emission gas.

As necessary, the turbo compound system further includes a turbocharger turbine 111 which is installed at the emission gas discharge side of the engine 110 and converts energy of emission gas into mechanical work, and a turbocharger compressor 112 which is operated by the turbocharger turbine 111, compresses air for fuel, and supercharges the compressed air into the engine 110, and the turbo compound system may supply air for fuel using waste energy like the related art.

According to the aforementioned configuration, waste energy of emission gas is recovered and converted into mechanical work (that is, power generation) in the blow-down turbine 120, power generated in the blow-down turbine 120 is transferred to the crank shaft 140 through the power transmission device 130*a*.

Meanwhile, for example, as illustrated in FIG. 12, as the power transmission device 130*a* of the turbo compound system for a vehicle, a mechanical power transmission device 130*a*, which includes a transmission 131*a* that is installed at an output side of the blow-down turbine 120, and a speed-reducing gear 132*a* that is installed at an output side of the transmission 131*a* so as to transfer power to the crank shaft 140, may be used.

There are two types of methods for the transmission 131*a*, such as a method of using a fluid and a direct contact type, and even though any one of the two types may be used, when the fluid type is used through a fluid coupling and the like, power transmission efficiency is slightly lower in comparison with the direct contact type, but matching development and control are easy, and system implementation performance is high.

In addition, as the power transmission device 130*a* of the turbo compound system, an electric power transmission device, which converts waste energy into electrical energy, and thereafter operates the auxiliary device for a vehicle and the like, may also be used.

The electric power transmission device includes a generator which is installed at an output side of the blow-down turbine 120, and a motor which is installed at an output side of the generator, operated by generated electric power, and connected to the auxiliary device for a vehicle.

In the electric power transmission device, generated electric power of the generator is used to charge a battery of the vehicle so as to start the vehicle, or generated electric power is directly supplied to various electric devices such as a lighting device or a display device for a vehicle, so as to be utilized in additional various forms. In addition, even though system costs are high compared to the mechanical type, high efficiency may be maintained in a wider operational range.

In addition, in the present disclosure, as the auxiliary device for a vehicle, which is used to recover and recycle waste energy of emission gas, various components of a vehicle may be used as long as the components may recover and recycle waste energy, except for the crank shaft 140 that has a high power load and is a subject to be essentially controlled in a vehicle.

For example, the auxiliary device for a vehicle is an air conditioner which greatly affects fuel consumption while being operated when the vehicle runs, and the air conditioner includes a compressor, a condenser, an expansion valve, an evaporator, and the like such that when the compressor is operated by the blow-down turbine 120, a motor for compression is operated by the blow-down turbine 120 so as to compress a refrigerant.

Of course, it is obvious that the condenser, the expansion valve, and the evaporator may also be operated by the blow-down turbine 120 in addition to the compressor.

In another example, as the auxiliary device for a vehicle, auxiliary machinery (simply referred to as 'auxiliary machine') such as a coolant pump, a fuel pump, a fuel fan, and the like, which assists driving of the engine, may also be used.

As illustrated in FIG. 12, in the turbo compound system according to the present disclosure, the bypass line 170, which is provided to bypass emission gas that flows into the blow-down turbine, is connected to front and rear sides of the blow-down turbine.

In addition, the bypass valve 171 is provided at the upstream portion of the bypass line 170 so as to control a flow of emission gas, and as the bypass valve 171, various valves such as a mechanical or electronic proportional valve may be used.

The turbo compound system may further include a first control unit for controlling the bypass valve 171. That is, based on an operational condition of the engine, an operation of opening and closing the bypass valve 171 is controlled.

Therefore, in order to prevent the problem that emission gas pressure of emission gas, which is discharged from the engine 110 in a low-speed and low-load state, is increased by the blow-down turbine 120, or a loss of thermal energy required for an emission gas after-treatment device occurs, a flow rate of emission gas, which is bypassed by the bypass line 170, is adjusted so that the mechanical turbo compound system may obtain optimum efficiency in all operational regions.

As illustrated in FIG. 12, in the turbo compound system according to the present disclosure, an actuator 180 is provided between the crank shaft 140 and the speed-reducing gear 132*a*. The actuator 180 may connect power supplied from the blow-down turbine 120 to the crank shaft 140, or may release the connection of power to the crank shaft 140.

Therefore, based on an operational condition of the engine, the actuator 180 releases the engagement in a state like the low-speed and low-load state, and makes the engagement in a state like a high-speed and high-load state, thereby improving fuel efficiency.

The turbo compound system may further include a second control unit for controlling the actuator 180. That is, based on an operational condition of the engine, an operation of the actuator 180 is controlled.

In the present disclosure, the crank shaft 140 may be connected to the speed-reducing gear 132*a* through the actuator 180, the blow-down turbine 120 may be connected to the power transmission device 130*a* through the second actuator (Actuator 2), and the power transmission device 130*a* may be connected to the auxiliary device for a vehicle through a third actuator (Actuator 3).

Therefore, an environment is provided to allow each of the crank shaft 140 and the blow-down turbine 120 to operate the auxiliary device for a vehicle, and to allow the second control unit to control power transmission of each of the crank shaft 140 and the blow-down turbine 120.

The first control unit and the second control unit may be integrally provided in an electronic controller unit (ECU) or an electronic power controller system (EPOS), which is equipped in various vehicles including heavy equipment, or may be modularized and separately provided, and a connection state of the actuator 180 and the bypass valve 171 are controlled by the control units, respectively.

The connection state is generally divided into 'connection' and 'connection release'. Of course, as necessary, the 'connection' is divided into various steps of 'connections' like an operation of shifting gears so as to adjust torque or speed, which is transferred to the auxiliary device for a vehicle, in several steps, and connection degrees may be controlled, respectively.

In addition, the first control unit and the second control unit preferably divide a case in which the engine 110 is in a variable (transient) operational state and a case in which the engine 110 is in the other operational states (for example, a constant-speed operational state), and control power, respectively, which is transferred from the crank shaft 140 and the power transmission device 130a to the auxiliary device for a vehicle.

The blow-down turbine 120 depends on thermal energy of emission gas of engine 110, and in this case, the thermal energy of emission gas is varied based on an operational condition of the vehicle (engine), and when thermal energy of emission gas is varied for every moment, power, which is supplied from the blow-down turbine 120 to the power transmission device 130a, is also varied.

Therefore, in the present disclosure, power, which is transmitted from the power transmission device 130a to the crank shaft 140 and the auxiliary device for a vehicle, is controlled based on an operational state, respectively, thereby allowing the turbo compound system to be stably operated.

That is, based on an operational condition of the engine 110, using the first control unit and the second control unit, the present disclosure connects the crank shaft 140 and the power transmission device 130a and releases the connection of the crank shaft 140 and the power transmission device 130a, and bypasses emission gas, which flows into the blow-down turbine 120, so as to adjust a flow rate of emission gas, thereby allowing the turbo compound system to be always and stably operated.

For example, in the case of the low-speed and low-load operational state, the connection of the actuator 180 is released so that only the crank shaft 140 is operated, and the bypass valve 171 is opened to bypass emission gas discharged from the engine 110 to the bypass line 170.

In this case, an amount of open degree of the bypass valve 171 may be operated in an on/off state, and a partial amount may be bypassed depending on the circumstances.

In addition, when the operational state is not the low-speed and low-load operational state but the constant-speed operational state or the high-speed and high-load operational state, the bypass valve 171 is closed so that emission gas discharged from the engine 110 flows into the blow-down turbine 120 without being bypassed to the bypass line 170.

In this case, the actuator 180, which is connected between the crank shaft 140 and the power transmission device 130a, is connected to transfer power of the power transmission device 130a to the crank shaft 140.

Figure 13:
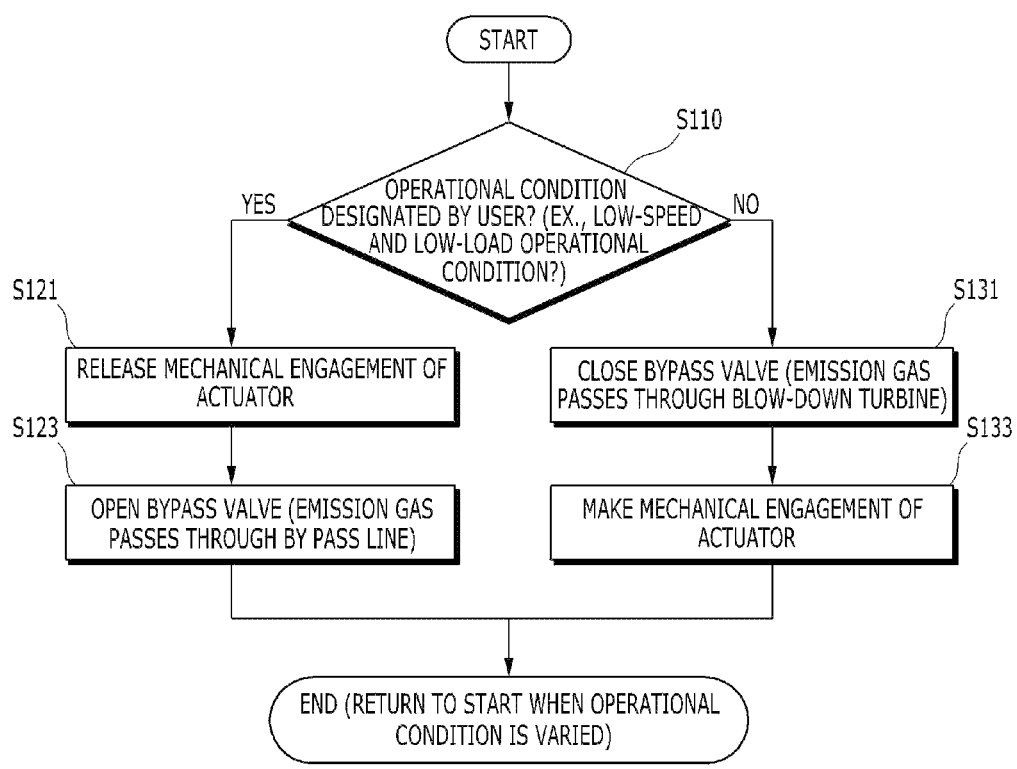
FIG. 13 is a flow chart illustrating a method of operating the mechanical turbo compound system of yet another exemplary embodiment according to the present disclosure.

Hereinafter, FIG. 13 is a flow chart explaining a process in which the turbo compound system according to the present disclosure selects operations of the bypass valve 171 and the actuator 180 based on an operational condition of the engine 110.

First, when an operation starts, an operational state of the vehicle (engine) is monitored, and it is determined whether the operational state is the constant-speed operational state or the low-speed and low-load operational state (S110). In addition to a manner in which the monitoring of the operational state is directly performed, a manner in which the monitoring of the operation state is performed by the ECU or the EPOS, and thereafter a result thereof is provided may also be used.

As a result of monitoring the operational state, in the case of the low-speed/low-load operational condition, the engagement of the actuator 180 is released, and the bypass valve 171 is opened to bypass emission gas to the bypass line 170 and discharge the emission gas.

In addition, in the constant-speed operational condition or the high-speed/high-load operational condition, the bypass valve 171 is closed so that emission gas flows into the blow-down turbine 120, and the engagement of the actuator 180 is maintained so that power of the power transmission device 130a is transferred to the crank shaft 140.

Further, in addition to the case in which the accessory device for a vehicle is operated only through the blow-down turbine 120, or the accessory device for a vehicle is operated only through the crank shaft 140, it is obvious that although not illustrated, based on operational states that may be varied in additional various forms, the accessory device for a vehicle may be simultaneously operated through both the blow-down turbine 120 and the crank shaft 140, and in this case, each connection degree may be controlled so as to be minutely adjusted for each step.

Specific exemplary embodiments of the present disclosure have been described above. However, it will be understood by a person with ordinary skill in the technical field to which the present disclosure pertains that the spirit and scope of the present disclosure are not limited to the specific exemplary embodiments, and various corrections and modifications may be made within the scope without departing from the subject matter of the present disclosure.

Therefore, the exemplary embodiments disclosed above are set forth to provide a complete understanding of the scope of the disclosure to a person with ordinary skill in the technical field to which the present disclosure pertains, it should be understood that the exemplary embodiments are described for illustration in all aspects and are not limited, and the present disclosure will only be defined by the scope of the claims.

The turbo compound system for a vehicle according to the present disclosure may be used for a turbo compound system for a vehicle which may recover emission gas energy and provide the energy to various auxiliary devices for a vehicle.

The invention claimed is:

1. A turbo compound system for a vehicle, comprising:
an internal combustion engine;
a blow-down turbine which is installed at an emission gas discharge side of the engine, and recovers waste energy by converting energy of emission gas into mechanical work;
a crank shaft which is rotated by the engine and connected with the blow-down turbine so that power is transferrable;
a first actuator which is installed between the blow-down turbine and the crank shaft; and
a power transmission device which is installed between the first actuator and the blow-down turbine, and receives power from the blow-down turbine;
an auxiliary device for the vehicle which is installed between the power transmission device and the first actuator;
a second actuator which is installed between the auxiliary device for the vehicle and the power transmission device; and
a control unit which controls a connection state of the blow-down turbine and
the auxiliary device for the vehicle by controlling the first actuator,
wherein the control unit releases a power connection between the crank shaft and the auxiliary device for the vehicle by controlling the first actuator when the engine is in a constant speed operating condition.

2. The turbo compound system of claim 1,
wherein the control unit connects the auxiliary device for the vehicle and the power transmission device so that the power is transferrable by controlling the second actuator when the engine is in a constant speed operating condition, and the control unit releases the power connection between the auxiliary device for the vehicle and the power transmission device by controlling the second actuator when the engine is in a variable operating condition.

3. The turbo compound system of claim 2, further comprising:
a third actuator which is installed between the power transmission device and the blow-down turbine,
wherein the control unit connects the power transmission device and the blow-down turbine so that the power is transferrable by controlling the third actuator when the engine is in the constant speed operating condition, and the control unit releases the power connection between the power transmission device and the blow-down turbine when the engine is in the variable operating condition, and
the power transmission device is an electric power transmission device including a generator, which is installed at an output side of the blow-down turbine, and a motor, which is installed at an output side of the generator.

4. The turbo compound system of claim 3, wherein the generator is connected to at least one of a battery of the vehicle and a plurality of electric devices installed in the vehicle and supplies power.

5. The turbo compound system of claim 1, further comprising:
a turbocharger turbine which is installed at an upstream of the blow-down turbine at the emission gas discharge side of the engine,
wherein the turbocharger turbine operates a turbocharger compressor installed at an intake side by converting energy of the emission gas into mechanical work.

6. The turbo compound system of claim 1, wherein the auxiliary device for the vehicle includes at least one of an air conditioner and auxiliary machinery of the engine.

\* \* \* \* \*